CUNO RHEDEN
INVENTOR

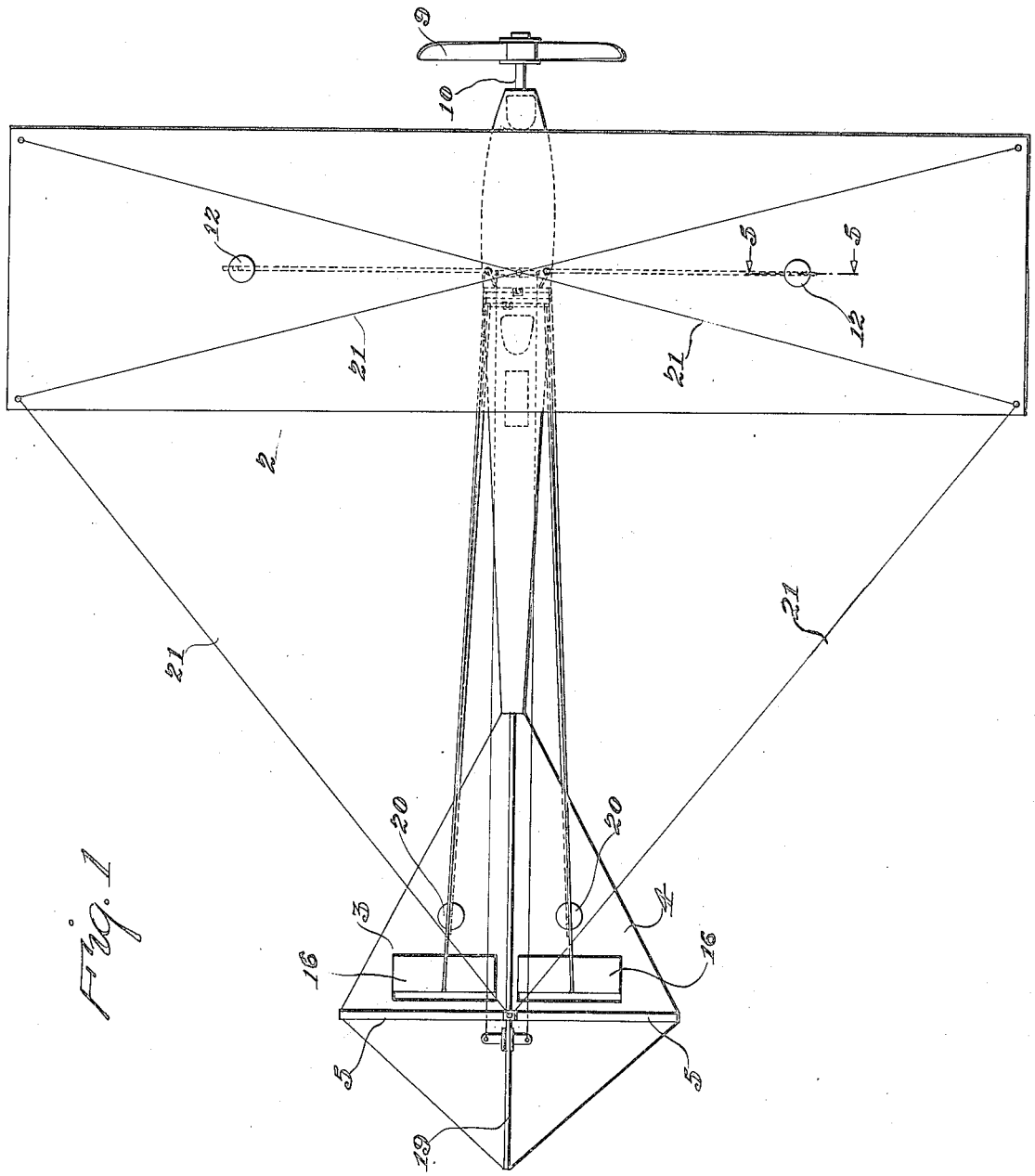

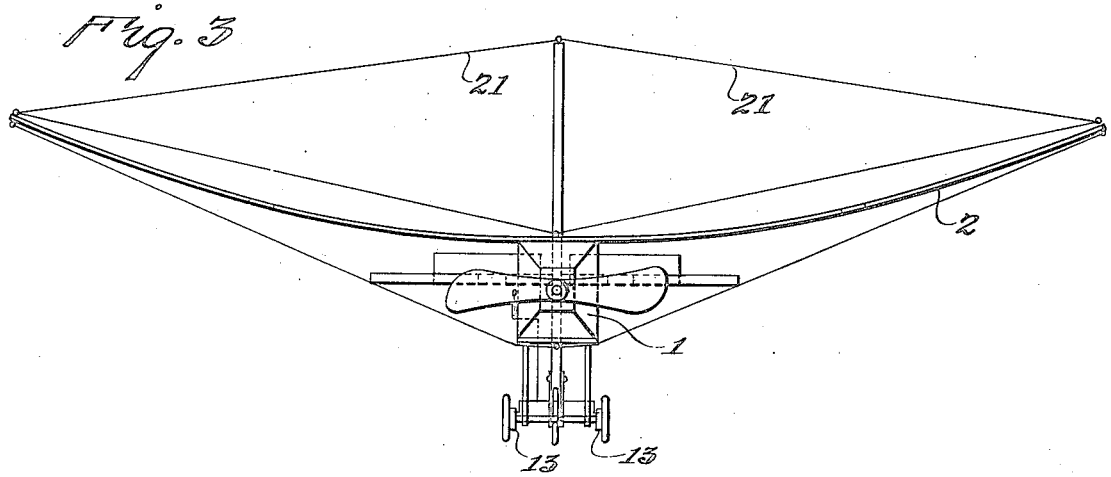
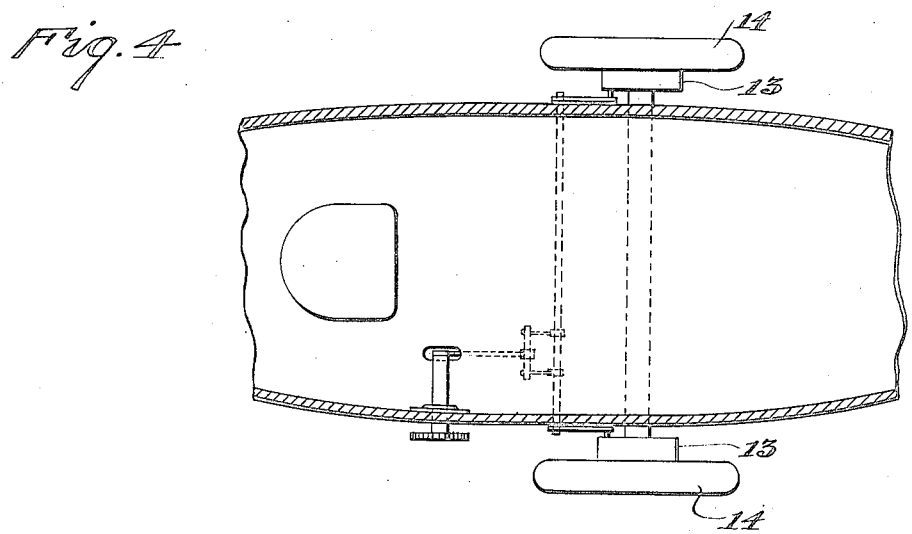
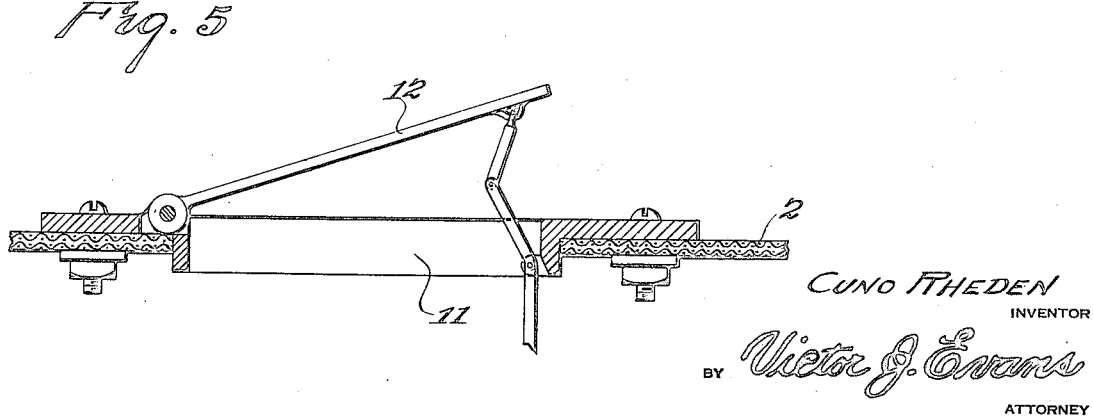

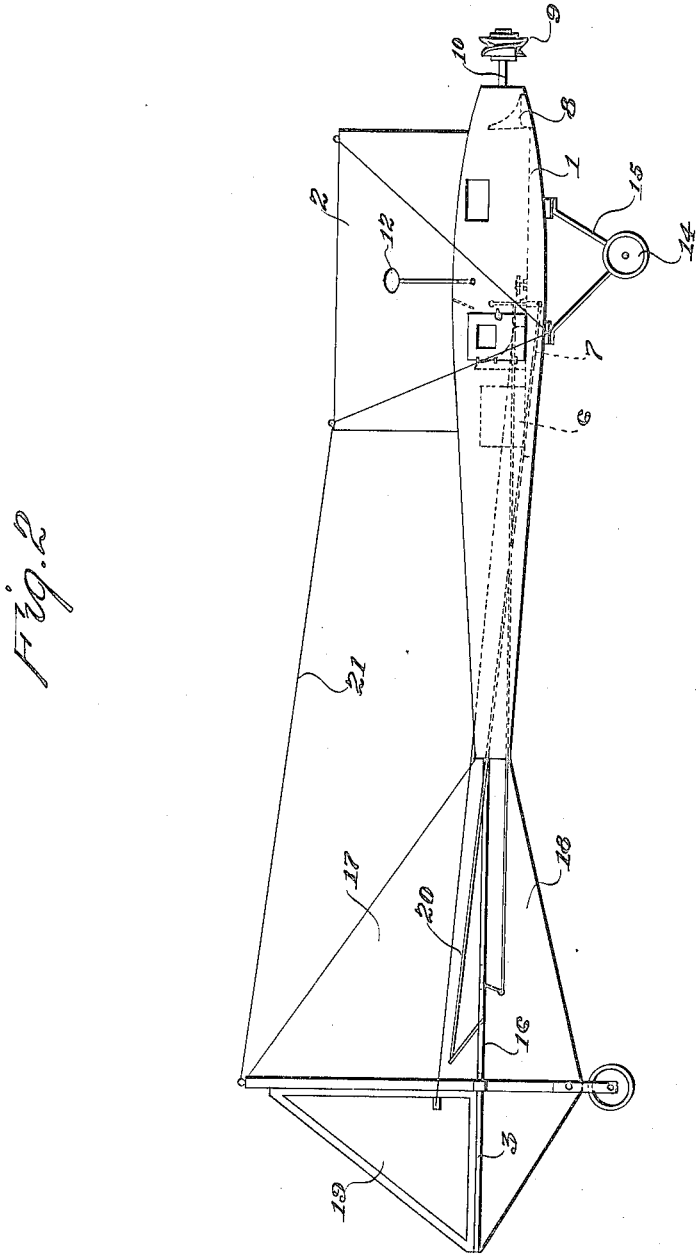

BY Victor J. Evans
ATTORNEY

Patented Jan. 2, 1923.

1,440,413

UNITED STATES PATENT OFFICE.

CUNO RHEDEN, OF CHICAGO, ILLINOIS.

AIRPLANE.

Application filed December 18, 1920. Serial No. 431,636.

*To all whom it may concern:*

Be it known that I, CUNO RHEDEN, a citizen of the United States, residing at Chicago, in the county of Cook and State of Illinois, have invented new and useful Improvements in Airplanes, of which the following is a specification.

This invention relates to airplanes and an object of the invention is to provide an airplane wherein the aerofoils are disposed relative to the tail fins to prevent nose diving or rearward tipping of the airplane and permit landing of the plane in a horizontal position as well as to prevent longitudinal tilting of the plane during flight.

Another object of this invention is to provide an airplane structure in which the wings and tail fins are arranged in such a manner as to permit the employment of brakes on the landing gear and allow relatively abrupt arresting of land travel of the airplane without causing the nose of the fuselage to bury itself into the ground.

A further object of this invention is to provide an airplane wherein relatively great tail fin surface is provided for co-acting with longitudinally curved aerofoils to properly stabilize the airplane which stabilizing is also facilitated by the positioning of the prime mover or engine of the airplane, in the fuselage, at the center of gravitation thereof, and also to provide ailerons which are carried by the horizontal tailfins to assist in controlling the flying of the airplane.

The relative positions and size of the aerofoils and tailfins and the positioning of the motor or engine will permit the airplane to land in an almost vertical path and to facilitate this landing action it is an object of this invention to provide valves in the aerofoils, controlled by the pilot which may be opened to allow the passage of air currents therethrough to decrease the air resistence of the aerofoils and permit quicker landing in a substantially vertical path.

Other objects of the invention will appear in the following detailed description and in the accompanying drawing wherein:

Fig. 1 is a top plan of the improved airplane.

Fig. 2 is a side elevation of the airplane.

Fig. 3 is a front elevation of the airplane.

Fig. 4 is a fragmentary horizontal section illustrating the brake mechanism.

Fig. 5 is a detailed section on the line 5—5 of Fig. 1 illustrating the valve structure.

Figure 6:
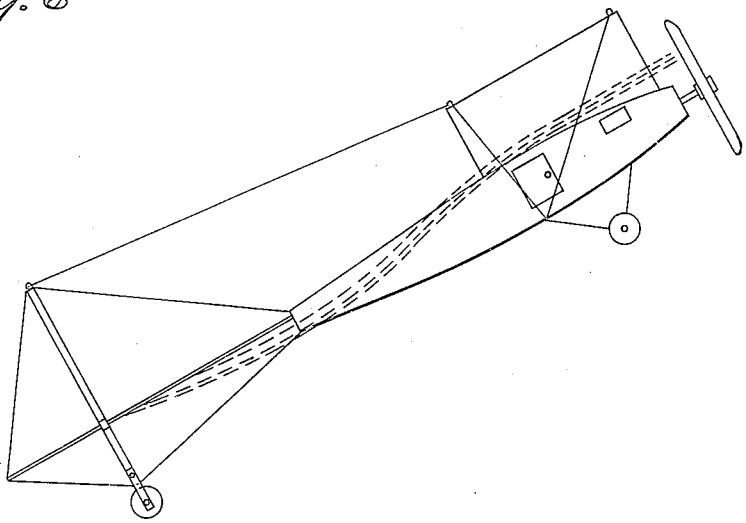
Fig. 6 is a diagrammatic view illustrating the action of air currents upon the tail fins when the airplane is tilted rearwardly.

Referring more particularly to the drawing the improved airplane comprises a fuselage 1 made up in any approved manner which carries an aerofoil 2. As shown in Fig. 3 of the drawing the aerofoil is curved to present a concave surface upwardly thereby having its tips at a greater elevation relative to the fuselage than its intermediate portion, however, the aerofoil is flat laterally so as to guide the air currents in a relatively straight stream along each side of the fuselage 1 to cause proper impinging action of the air currents against the horizontal tail fins 3 and 4. The horizontal tail fins 3 and 4 are substantially triangular in shape and are braced by suitable strips 5 to provide the necessary rigidity to these members. The horizontal tail fins 3 and 4 are positioned below the elevation of the aerofoil 2 as clearly shown in Fig. 2 of the drawing in such a manner as to cause the currents of air to travel along the fuselage 1 to be split horizontally and maintain a relatively even pressure against both the upper and under surfaces of the tailfins 3 and 4 during flight however, in case the rear end of the airplane tilts downwardly the passage of the air currents will be such as to cause the majority of them to impinge against the under surface of the horizontal tail fins causing lifting action to the tail of the airplane which will raise it and cause quick righting of the airplane.

Figure 7:
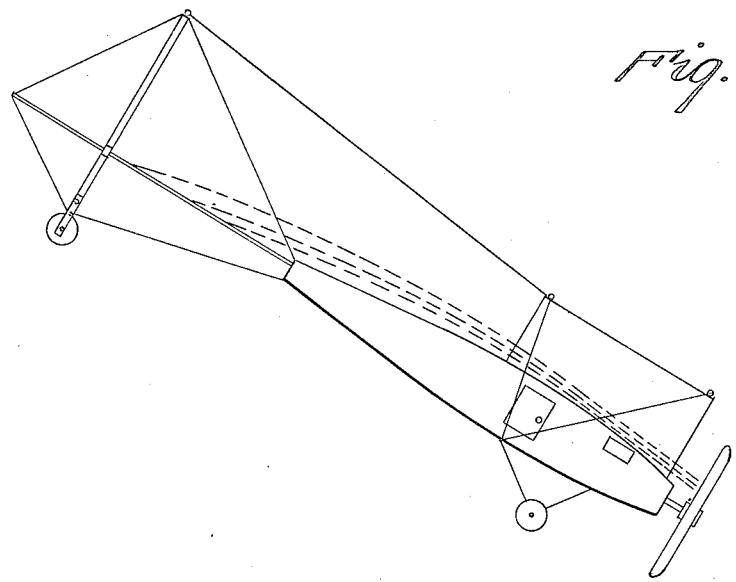
Fig. 7 is a diagrammatic view illustrating the passage of air currents when the airplane is tilted forwardly.

Fig. 6 of the drawing shows, diagrammatically, the action of the air currents on the tail fins 3 and 4 when the rear or tail end of the airplane tilts downwardly while Fig. 7 illustrates, diagrammatically, the action of the air currents when the airplane tilts as in a nose dive at which time the major portion of the air currents will impinge against the upper surface of the tail fins 3 and 4 and effectively right the plane. It will thereby be seen that the relation of the air foil 2 and its particular construction together with the horizontal tail fins 3 and 4 will effect horizontal balancing of the airplane and materially increase the safety of flight of the machine.

The motor or engine, indicated at 6, is positioned in the fuselage 1, preferably in alignment with the center of gravity of the airplane for co-operating with the aerofoil 2 and tail fins 3 and 4 in horizontally balancing the airplane. When the engine or motor is thus positioned the pilot seat, as indicated at 7 is located forwardly of the engine and an observer's seat 8 is preferably located in the nose of the fuselage forwardly of the forward edge of the aerofoil 2 to permit a clear vision by the observer. Propeller 9 of the airplane is positioned, in the usual manner, forwardly of the nose of the fuselage and is reached from the engine 6 by the drive shaft 10 in the usual manner of airplane structure.

To facilitate landing of the airplane in a relatively small space, the aerofoil 2 is provided with openings 11 one on each side of the longitudinal axis of the fuselage 1. The valves 12 of any preferred construction, are associated with the openings 11 and are operated from the pilot seat by any approved structure to permit and control the passage of air currents vertically through the aerofoil 2 to decrease the air resistance of the aerofoil and permit quicker and more abrupt landing.

The co-operation of the aerofoil and tail fins 3 and 4 together with the valves 12 permit the use of brakes 13 of any approved construction upon the wheels 14 of the landing gear 15. The breaks 13 may be operated by the pilot from his seat through the medium of any approved structure such as indicated in Fig. 4 of the drawing.

The horizontal tail fins 3 and 4 have ailerons 16 carried thereby and controllable from the pilot's seat by any approved aileron control mechanism for assisting in controlling the flight of the airplane and the vertical tail fins 17 and 18 are also substantially triangular in shape and if so desired, the upper rear portion of the upper vertical tailfins 17 may be used as a rudder as shown at 19, preferably in the usual manner from the pilot's seat.

The horizontal tail fins 3 and 4 are also provided with valves 20 similar to the valves 12 and operable in unison with the valves 12.

Suitable guy wires 21 are provided for bracing the aerofoil, and tail fins.

From the foregoing description taken in connection with the accompanying drawing it will be apparent that an airplane structure has been provided which will rise easily, quickly, land in a relatively small space and which will not tilt to any material extent either during rising or landing, but will have a tendency to move vertically and one that, owing to the ailerons, on the horizontal or lateral tailfins, will climb steeply.

It is, of course, to be understood that the invention may be constructed in various other manners and the parts associated in different relations, and therefore, I do not desire to be limited in any manner except as set forth in the claims hereunto appended.

Having thus described my invention what I claim is:

1. In an airplane, a fuselage, an aerofoil carried thereby horizontal tailfins carried by the fuselage and arranged relative to the aerofoil to equalize air pressure on both the upper and lower surface of the tailfins when the airplane is horizontal, and valves carried by said aerofoil and horizontal tailfins to permit vertical passage of air through the aerofoil and tailfins.

2. In an airplane, a fuselage, an aerofoil carried thereby horizontal tailfins carried by the fuselage and arranged relative to the aerofoil to equalize air pressure on both the upper and lower surface of the tailfins when the airplane is horizontal, and valves carried by said aerofoil and horizontal tailfins to permit vertical passage of air through the aerofoil and tailfins, and ailerons carried by said horizontal tailfins.

3. In an airplane, a fuselage, an aerofoil carried thereby horizontal tailfins carried by the fuselage and arranged relative to the aerofoil to equalize air pressure on both the upper and lower surface of the tailfins when the airplane is horizontal, valves carried by said aerofoil and horizontal tailfins to permit vertical passage of air through the aerofoil and tailfins, and ailerons carried by said horizontal tailfins, said aerofoil being longitudinally curved and flat laterally.

4. In an airplane, a fuselage, an aerofoil carried thereby, horizontal tailfins carried by the fuselage and arranged relative to said aerofoil to equalize air pressure on both the upper and lower surface of the tailfins when the airplane is horizontal, and valves carried by said horizontal tailfins to permit vertical passage of air through the tailfins.

5. In an airplane, a fuselage, an aerofoil carried thereby, horizontal tailfins carried by the fuselage, valves carried by said aerofoil to permit vertical passage of air therethrough, and ailerons carried by said horizontal tailfins.

6. In an airplane, a fuselage, an aerofoil carried thereby and extending transversely thereto, said aerofoil curved longitudinally in a uniform arc throughout its entire length, and valves in said aerofoil to permit vertical passage of air through the aerofoil.

7. In an airplane, a fuselage, an aerofoil carried thereby and extending transversely thereto, said aerofoil curved longitudinally in a uniform arc throughout its entire length, and valves in said aerofoil to permit vertical passage of air through the aerofoil, horizontal tailfins carried by said fuselage, and ailerons carried by said tailfins.

8. In an airplane, a fuselage, an aerofoil carried thereby and extending transversely thereto, said aerofoil curved longitudinally in a uniform arc throughout its entire length, and valves in said aerofoil to permit vertical passage of air through the aerofoil, horizontal tailfins carried by said fuselage, and ailerons carried by said tailfins, and valves in said tailfins to permit vertical passage of air through the tailfins.

9. In an airplane, a fuselage, a tail structure carried thereby comprising a pair of triangular horizontal tailfins, upper and lower vertical tailfins positioned along the bases of said horizontal tailfins and being triangular in shape, the rear portion of said upper vertical tailfins formed by a line along the altitude being hingedly supported to form a rudder, a transverse aerofoil carried by said fuselage and curved longitudinally in a uniform arc throughout its length, said horizontal tailfins being positioned below the elevation of the lower-most part of said aerofoil.

10. In an airplane, a fuselage, a tail structure carried thereby comprising a pair of triangular horizontal tailfins, upper and lower vertical tailfins positioned along the bases of said horizontal tailfins and being triangular in shape, the rear portion of said upper vertical tailfin formed by a line along the altitude being hingedly supported to form a rudder, a transverse aerofoil carried by said fuselage and curved longitudinally in a uniform arc throughout its length, said horizontal tailfins being positioned below the elevation of the lower-most part of said aerofoil, and ailerons carried by said horizontal tailfins.

11. In an airplane, a fuselage, horizontal tailfins carried thereby, ailerons carried by said tailfins, and valves in said tailfins to permit vertical passage of air therethrough.

In testimony whereof I affix my signature.

CUNO RHEDEN.